US005534174A

United States Patent [19]
Harstick et al.

[11] Patent Number: 5,534,174
[45] Date of Patent: Jul. 9, 1996

[54] GRAFT COPOLYMER COMPRISING A STAR-SHAPED POLYMER AND AN N-ALLYL AMIDE

[75] Inventors: Christian S. Harstick, St. Louis; Kenneth O. Henderson, Florissant, both of Mo.

[73] Assignee: Ethyl Petroleum Additives, Inc., Richmond, Va.

[21] Appl. No.: 511,663

[22] Filed: Apr. 20, 1990

[51] Int. Cl.$^6$ ...................... C10M 133/16; C10M 149/00
[52] U.S. Cl. ........................... 508/543; 525/193; 525/294; 525/296
[58] Field of Search ....................... 252/51.5 A; 525/193, 525/294, 296

[56] References Cited

U.S. PATENT DOCUMENTS

| | | | |
|---|---|---|---|
| 4,116,917 | 9/1978 | Eckert | 260/33.6 AQ |
| 4,141,847 | 2/1979 | Kiovsky | 252/51.5 A |
| 4,146,489 | 3/1979 | Stambaugh et al. | 252/50 |
| 4,160,739 | 7/1979 | Stambaugh et al. | 252/51.5 A |
| 4,358,565 | 11/1982 | Eckert | 252/50 |
| 4,427,834 | 1/1984 | Martin | 252/51.5 R |
| 4,490,267 | 12/1984 | Eckert | 252/51.5 A |
| 4,519,929 | 5/1985 | O'Brien et al. | 252/51.5 A |
| 4,557,849 | 12/1985 | Eckert | 252/51.5 R |

Primary Examiner—Margaret Medley
Attorney, Agent, or Firm—Dennis H. Rainear

[57] ABSTRACT

Graft copolymers of a star-shaped polymer and an N-allyl amide manifest dispersant and viscosity index-improving properties.

22 Claims, No Drawings

GRAFT COPOLYMER COMPRISING A STAR-SHAPED POLYMER AND AN N-ALLYL AMIDE

BACKGROUND OF THE INVENTION

1. Field of the Invention

The present invention relates to lubricating oil dispersants and dispersant viscosity index improvers prepared from N-allyl amide graft copolymers. More particularly, this invention relates to dispersants and dispersant viscosity index improvers comprising star-shaped polymers having an N-allyl amide grafted thereonto.

2. Related Art

U.S. Pat. No. 4,519,929 discloses N-allyl amide graft copolymers wherein an N-allyl amide is grafted onto an olefin polymer backbone. Such copolymers are useful as ashless dispersants and, in the case of high molecular weight materials, as viscosity index improvers. U.S. Pat. No. 4,146,489 discloses graft copolymers wherein a vinyl-substituted nitrogen compound, such as vinyl pyridine or N-vinyl pyrrolidone, is grafted onto an olefin backbone. U.S. Pat. No. 4,160,739 discloses graft copolymers wherein maleic anhydride and a comonomer, such as methyl methacrylate, are grafted onto an olefin backbone and subsequently amidated.

U.S. Pat. No. 4,116,917 discloses hydrogenated star-shaped polymers useful as viscosity index improvers, such polymers possessing thickening efficiency at high temperature while also possessing low temperature viscosity characteristics, oxidative and permanent shear stability and improved temporary shear loss.

U.S. Pat. Nos. 4,141,847; 4,427,834; 4,490,267: and 4,557,849 disclose functionalized star-shaped polymers having dispersant and/or viscosity index improving properties.

SUMMARY OF THE INVENTION

It has now been discovered that by grafting an N-allyl amide onto a star-shaped polymer, preferably, a hydrogenated star-shaped polymer, a graft copolymer is obtained which is useful as a dispersant and/or a dispersant viscosity index improver having an unexpected high level of dispersancy as well as excellent shear stability and low temperature viscosity characteristics.

DETAILED DESCRIPTION OF THE INVENTION

The subject graft copolymers are prepared by reacting a star-shaped polymer, preferably, a hydrogenated star-shaped polymer, with an N-allyl amide in the presence of a free radical generating catalyst.

The term "star-shaped polymer" or "star polymer" as utilized herein refers to polymers having a poly(polyalkenyl coupling agent) nucleus and at least 4, preferably 7–15, polymeric arms linked to such nucleus. These arms are typically selected from hydrogenated homopolymers and copolymers of conjugated dienes, hydrogenated copolymers of conjugated dienes and monoalkenyl arenes, and mixtures thereof. Such star-shaped polymers are prepared by polymerizing one or more conjugated dienes and, optionally, one or more monoalkenyl arenes, in solution and in the presence of an ionic initiator to form a living polymer. The polymerization product (referred to generally as a living polymer) is then reacted with a polyalkenyl coupling agent to form the star-shaped polymer. Preferably, such star-shaped polymers are then hydrogenated.

Suitable star-shaped polymers are those which are adapted to have an N-allyl amide grafted thereto under free-radical conditions. Exemplary star-shaped polymers include those wherein the poly(polyalkenyl coupling agent) nucleus is divinyl benzene and each of the polymeric arms consists of a polymeric material selected from the group consisting of polyisoprene or polybutadiene homopolymers, poly(isoprene/butadiene) copolymers, poly(isoprene/styrene) random copolymers, and poly(isoprene/styrene/isoprene) three block copolymers, the number of polymeric arms linked to the nucleus ranging from about 4 to about 15, preferably from about 7 to about 12. The polymeric arms of such suitable star-shaped polymers are preferably hydrogenated. Suitable star polymers will have a number average molecular weight ranging from about 2,000 to about 300,000, such as from about 10,000 to about 200,000, and most preferably from about 30,000 to about 140,000.

These star-shaped polymers and methods for preparing and hydrogenating them, are disclosed in U.S. Pat. No. 4,116,917 (assigned to Shell Oil Company) which patent is hereby incorporated by reference. Such star polymers are also disclosed in U.S. Pat. Nos. 4,141,847; 4,427,834; 4,490,267 and 4,557,849 (all of which are assigned to Shell Company). The hydrogenated star polymers are also commercially available from Shell Chemical Company, Houston, Tex. and are marketed under the trade name "Shellvis" star polymers. A preferred family of star polymers is "Shellvis 200" star polymers which are hydrogenated star polymers having divinyl benzene as the nucleus and poly(isoprene/styrene) random copolymer arms linked thereto, and which have a number average molecular weight of about 80,000.

Suitable N-allyl amides include those which are adapted to be grafted to the star-shaped polymers described above under free-radical polymerization conditions. A wide variety of N-allyl amides are suitable in making the copolymers of the present invention. Preferred N-allyl amides can be represented generally by the formula:

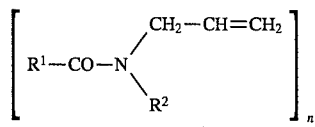

wherein $R^1$ represents hydrogen and optionally substituted alkyl and alkenyl radicals having from 1 to about 30 carbon atoms, or may be absent; $R^2$ represents hydrogen, optionally substituted alkyl and alkenyl radicals having from 1 to about 30 carbon atoms, optionally substituted cycloalkyl radicals having from about 6 to about 10 carbon atoms, and optionally substituted aryl radicals having from about 6 to about 10 carbon atoms; or n is 1 or when $R_1$ is absent n is 2.

Exemplary preferred N-allyl amides include N,N-diallyl formamide, N,N-diallyl acetamide, N,N-diallyl propionamide, N,N-diallyl butyramide, N,N-diallyl dodecamide, N,N-diallyl octadecamide, N,N-diallyl triacontamide, N,N-diallyl benzamide, N,N-diallyl naphthamide, N,N-diallyl-p-methyl benzamide, N-allyl formamide, N-allyl-N-methyl acetamide, N-allyl-N-ethyl propionamide, N-allyl-N-dodecyl formamide, N-allyl-N-eicosyl dodecamide, N-allyl-N-triacontyl benzamide, N-allyl-p-methyl benzamide, N,N'-diallyl oxamide, N,N,N'-triallyl oxamide, N,N,N',N'-tetraallyl oxamide, N,N-diallyl acrylamide, N-allyl-N-methyl acrylamide and the like, including mixtures thereof.

Wherein it is indicated above that the $R_4$ and $R_2$ radicals may be substituted, preferable substituents will be of a nature and/or in a position on the radical such that the graft polymerization is substantially unaffected and such that the dispersancy and dispersant viscosity index improving properties are not significantly reduced. Preferably, such substituents will be adapted to stabilize an intermediate radical formed during the free-radical polymerization process. Examples of stabilizing substituents include aryl, ester, nitrile and halide substituent groups. It is contemplated that such substituents may be ester, amino, amido, acetamido, aryl, benzamide carboxyl, halo, heterocyclyl, hydroxyl, ether, thioether, sulfonate, phosphorus-containing groups (e.g., phospho, phosphono, phosphoro and phosphonamide), cyano, sulfonyl, sulfinyl, keto, benzenesulfonamide, benzenesulfanyl, sulfonamide, sulfonyl, nitro, nitroso, nitrile, and aldehyde groups. Exemplary substituted N-allyl amides include N,N-diallyl lactamide, N,N-diallyl levulinamide, N,N-diallyl ethyl thioacetamide, 3-(N',N'-diethylamino)N, N-diallyl propionamide, N,N-diallyl 3-cyanopropionamide, N,N-diallyl 3-methyl sulfonyl propionamide, ethyl N,N-diallyl oxamate, and the like, including mixtures thereof.

The more preferred N-allyl amides are the N-allyl formamides. The most preferred N-allyl amide is N,N-diallyl formamide.

Other ethylenically unsaturated monomers can be co-grafted onto the hydrogenated star-shaped polymer backbone together with the N-allyl amides. For example, other co-graft monomers include vinyl pyridines, N-vinyl pyrrolidones, $C_{1-30}$ alkyl methacrylates, and the like, including mixtures thereof.

The amount of the co-grafted monomer used in addition to the N-allyl amide can vary over a wide range. When used, such co-grafted monomer is preferably reacted in the same concentration range as will be set forth for the N-allyl amides. These co-grafted monomers can be grafted before or after the N-allyl amide graft but are preferably grafted concurrently with the N-allyl amide.

The N-allyl amide can be grafted to a star-shaped polymer by forming a mixture of such star-shaped polymer, the N-allyl amide and a small amount of a free radical-generating catalyst and heating the mixture to a temperature high enough to cause the graft reaction to proceed at a reasonable rate but not so high as to cause destructive decomposition of the reactants or products.

The amount of the N-allyl amide can vary over a wide range and will be determined by the degree of dispersancy to be imparted to the final graft copolymer product. A useful range is from about 10 to about 500 grams for each Kg of star polymer. A preferred range is from about 20 to about 250 grams of each Kg of star-polymer, and a most preferred range is from about 50 to about 200 grams of the N-allyl amide for each Kg of such star-polymer. An excess amount of the N-allyl amide can be used and any that remains unreacted after the reaction can be removed by distillation.

Free radical catalysts which are useful in the reaction include commercially available azo and inorganic and organic peroxide initiators such as ammonium acetate, hydrogen peroxide, dilauroyl peroxide, t-butyl peroxide, 2,2-di(butylperoxy)butane, dicumyl peroxide, 2,2-azobis(2-methyl propionitrile), 2-butylazo-2-cyanobutane, 4(t-butylperoxycarbonyl)-3-hexyl-6-(t-butylperoxycarbonyl)heptyl-cyclohexane and the like.

Preferred catalysts include hydrogen peroxide, di-t-butyl peroxide, dibenzoyl peroxide, diacetyl peroxide, dilauroyl peroxide, t-butyl perbenzoate, 2,2-azobis-(2-methyl propionitrile), 2-butylazo-2-cyanobutane, 4-(t-butylperoxycarbonyl)-3-hexyl-6-(t-butylperoxycarbonyl) heptylcyclohexane and the like.

Advantageous catalysts include di-t-butyl peroxide, dibenzoyl peroxide, diacetyl peroxide, dilauroyl peroxide, t-butyl perbenzoate, t-amyl peroctanoate, dicumyl peroxide and the like.

In general, the preferred catalysts are organic peroxides which decompose between about 50° and 180° C. and are known to induce graft copolymerization. The catalyst may comprise from about 0.10 to about 18% by weight of the polymeric material, preferably 1–13% by weight of the polymeric material. Advantageously, the catalyst comprises from about 2 to about 11% by weight of the polymeric material. Chain terminating agents, which are well known to those skilled in the art, may be included to further control the molecular weight of the desired copolymer.

The temperature of the reaction may be from about 50° C. to 190° C., preferably from about 110° C. to about 170° C. and most preferably from about 130° C. to about 160° C. Ideally, the temperature is chosen to be equal to the 10 hour half-life temperature of the free-radical generating catalyst.

The reaction may be conducted in bulk or in solution over a period of time from about 0.5 to about 10 hours under ambient pressure conditions. Preferably, the reaction is conducted in solution. In addition, the reaction may be conducted under pressure such as up to about 40 atmospheres, preferably within a range of from about 1 to about 3 atmospheres.

Polymers having molecular weights above about 2,000 are very viscous, and in fact, above 10,000, such polymers are usually rubber-like materials. When the polymer is too viscous to stir, or is a rubber, it is preferred to conduct the reaction in an inert solvent. Useful solvents include poly-(alpha-olefins) and aliphatic hydrocarbons such as nonane, decane, and the like. Likewise, chlorinated hydrocarbons can be used such as chlorobenzene, dichlorobenzene, dichlorotoluene and the like. The presence of olefins and aromatics is generally deleterious although small amounts may be tolerated if the amounts of reactants are increased.

Preferred solvents are poly(alpha-olefins). Especially preferred are the poly(alpha-olefins) comprising hydro-treated (hydrogen-treated) liquid oligomers of $C_6$-$C_{12}$ alpha-olefins such as a trimer of alpha-decene. Such poly(alpha-olefins) will typically have a 100° C. viscosity of from about 2 to about 10 centistokes. Preferred poly(alpha-olefins) are those having a 100° C. viscosity of from about 4 to about 8 centistokes, most preferably a 100° C. viscosity of from about 5 to about 7. Another useful solvent is a neutral mineral oil commonly referred to as process oil. This oil is preferably a hydrogen-treated oil which has been processed through a refinery procedure such as hydrocracking or hydrotreating.

The amount of oil diluent used should be sufficient to produce a handleable product. When effective grafting is obtained, the viscosity of the product may increase significantly. Thus, the higher molecular weight polymers require greater dilution. To improver handleability the product may be mechanically homogenized.

The amount of diluent used should be the amount required to dissolve the polymer and form a stirrable mixture. This can vary from none in the case of low molecular weight polymers (e.g. 500–2,000 number average molecular weight) up to about 20 Kg per Kg of polymer in the case of high molecular weight polymers (e.g., 2,000–250,000). The rubber-like polymers can be dissolved in the solvent by cutting the polymer into small pieces and stirring the pieces in the solvent oil at an elevated temperature (e.g. 50°–250° C.) until a homogeneous solution forms.

The graft reaction is conducted for a time period sufficient to permit the N-allyl amides to graft onto star polymer backbone. The time is not a critical limitation. A useful period is about 30 minutes to about 4 hours, although longer or shorter periods may be used.

The resulting graft copolymers will preferably have a number average molecular weight ranging from about 2,000 to about 500,000. More preferably, the graft copolymers of this invention will have a number average molecular weight of from about 10,000 to about 400,000, and most preferably from about 30,000 to about 150,000.

The graft copolymers of the present invention are useful as dispersants and dispersant viscosity index improvers in lubricating oils. When utilized as a dispersant, such graft copolymers are provided in the form of a concentrate comprising a dispersant amount of the graft copolymer and diluent oil. When utilized as a dispersant viscosity index improver, such graft copolymers will be provided either separately from a concentrate containing a dispersant, e.g., a succinimide type dispersant, or will be provided as part of the concentrate which contains a dispersant.

The concentrates of this invention can contain optional additives. For example, detergent additives are one such optional additive. As used in the compositions of the present invention, such detergent additives include alkali and alkaline earth metal petroleum sulfonates and salicylates, alkali and alkaline earth metal alkyl or alkaryl sulfonates and salicylates, alkyl phenates and metal carboxylates. Examples of these are calcium petroleum sulfonates and salicylates, magnesium petroleum sulfonates and salicylates, barium alkaryl sulfonates amd salicylates, calcium alkaryl sulfonates, magnesium alkaryl sulfonates and salicylates, and calcium and magnesium alkylsulfonates and salicylates. Both neutral and overbased sulfonates, salicylates or phenates, which have base numbers up to about 600 to provide acid neutralizing properties, can be beneficially used and are commercially available. These detergent additives are generally used in an amount to provide about 0.05–1.5 weight percent (based on the concentrate) alkaline earth metal and more preferably about 0.1–1.0 weight percent. The lubricating oil compositions of the present invention preferably contain a calcium petroleum sulfonate or an alkaryl (e.g. alkylbenzene) sulfonate as a detergent additive.

Additional optional additives for the compositions of the present invention include ashless antioxidants such as hindered alkyl phenols, alkyl diphenyl amines, and sulfur bridged alkyl phenols; antiwear/corrosion inhibitors such as dialkyl selenides, metal dithiocarbamates, sulfurized terpenes and zinc dihydrocarbyldithiophosphates (ZDDP); friction reducers and EP additives such as N-alkylglycineamides, chlorinated paraffins, sulfurized olefins, sulfurized fatty oils, sulfurized hydroxy substituted fatty amides, and co-sulfurized fatty acid amides and esters; antifoam agents such as acrylate copolymers and silicones; and surfactants such as ethoxylated alkyl phenols and poly (alkyleneoxides).

When a graft copolymer of the present invention is utilized as a dispersant in a typical dispersant-inhibitor (DI) package and/or as a dispersant viscosity index improver included in a DI package, such graft copolymers and optional additives are combined in a diluent oil such as mineral oil, synthetic oil or mixtures thereof in proportions by weight which are effective in providing a liquid concentrate which is a storage stable liquid composition in that it does not form a gel, or significant amounts of precipitate, on standing for at least 30 days at 70° C. Useful diluent oils for forming the concentrates include neutral mineral oils which can be process oils, which are solvent refined oils, and hydro-treated (hydrogen treated) oils. Examples include process oil #5 and 80 neutral oil.

Normally, the diluent oil is added to the lubricant additive concentrates either during their preparation and/or after preparation for ease of handling purposes, and this oil, in addition to all other oil, is included in calculating the total amount of oil required in providing the stable compositions of the invention. Accordingly, the proportions of all of the active components given herein are on the basis of "active ingredient" i.e. not including added oil.

To provide a concentrate wherein a graft copolymer of the present invention is utilized as a dispersant, the ratio of the amount of oil based on the total weight of concentrate to the amount of active ingredients is typically from about 0.4:1 to about 0.56:1 for conventional dispersant-inhibitor (DI) packages without a viscosity index improver.

To provide a concentrate which includes a copolymer of the present invention as a dispersant viscosity index improver, the ratios of total oil (the sum of all oil utilized in the concentrate) to total active or additive ingredients (active ingredients not including any oil) should be within a range of from about 0.60:1 to about 3.3:1, preferably from about 0.7:1 to about 3.2:1.

The composition can also comprise one or more of the other additives described above in effective amounts. As utilized below, weight percent is based on the total weight of the concentrate. For example, to the compositions of the present invention can be added up to about 10 weight percent ashless antioxidants (preferably about 0.05 to 5 weight percent), up to about 15 weight percent detergent (preferably about 5 to 10 weight percent), up to about 10 weight percent antiwear/corrosion inhibitor (preferably about 0.05 to 5 weight percent), up to about 10 weight percent friction reducer (preferably about 0.05 to 5 weight percent), up to about 2 percent surfactant (preferably about 0.1 to 1 percent) and up to about 2 percent surfactant (preferably 0.1 to 1 percent) and up to about 1 weight percent antifoam (preferably about 0.01 to 0.1 weight percent). It is well known in the art that the presence of some of these other additives as well as other factors can cause a change in the above concentration parameters, i.e., the amount of components useful in the compositions of the present invention for dispersant, dispersant viscosity index improver and oil which are necessary to provide a stable concentrate. The type and molecular weight of the viscosity index improver will also shift the parameters. It is well within the ability of one skilled in the art to modify the weight percentages of each of the additives and the diluent oil to achieve a stable concentrate containing a selected dispersant viscosity index improver according to the teachings of the present invention.

The concentrates of the present invention can be formed using conventional blending equipment and techniques. They are blended with base oils in amounts to provide the required additive levels in the finished crankcase lubricating oils, e.g., treat rates of from about 10 to about 20 percent. Suitable base oils, as known in the art, include both mineral and synthetic oils and blends thereof.

Mineral oils include those of suitable viscosity refined from crude oil from all sources including Gulf coast, mid-continent, Pennsylvania, California, Mideast, North Sea, Alaska, and the Far East and the like. Various standard refinery operations are useful in processing the mineral oil.

Synthetic oils include both hydrocarbon synthetic oils and synthetic esters. Useful synthetic hydrocarbon oils include liquid polymers of alpha-olefins having the proper viscosity. Especially useful are the hydrotreated, liquid oligomers of $C_6$-$C_{12}$ alpha-olefins such as alpha-decene trimer. Likewise, alkylbenzenes of proper viscosity can be used as a synthetic oil, such as didodecylbenzene.

Useful synthetic esters include the esters of both monocarboxylic acids and polycarboxylic acids as well as monohydroxy alkanols and polyols. Typical examples are didodecyl adipate, trimethylolpropane propane tripelargonate, pentaerythritol tetracaproate, di(2-ethylhexyl)adipate, dilauryl sebacate and the like. Complex esters prepared from mixtures of mono- and dicarboxylic acids and mono- and polyhydroxyl alkanols can also be used.

The invention is further illustrated by, but is not intended to be limited to, the following examples wherein parts and percentages are by weight unless otherwise indicated.

EXAMPLE 1

A sample of a hydrogenated star-shaped polymer (Shellvis 250, Shell Chemical Co., Houston, Tex.) is dissolved in a poly(alpha-olefin) (number average molecular weight of 548.6 and 100° C. viscosity of 6 centistokes) at 15 weight percent. Subsequently, 1.0 weight percent of N,N-diallyl formamide is mixed into the polymer solution under nitrogen and at a temperature of about 150°–155° C. Then, 0.3 weight percent of di-tert-butyl peroxide is added with rigorous stirring and held at about 150°–155° C. for 180 minutes. The reaction mixture is then cooled giving a viscous solution.

EXAMPLE 2

Several graft copolymers, the compositions of which are shown in Table 1, were prepared according to the procedure set forth in Example 1 with certain exceptions which are shown in the Table.

The effectiveness of these graft copolymers as lubricating oil dispersants was measured using a bench dispersancy test. In this test, an asphaltene sludge was made by air oxidation of 100 neutral oil using an iron naphthenate catalyst. The oxidized oil containing precipitated sludge was diluted with heptane to dissolve that part of the sludge which was soluble in heptane. The sludge-saturated heptane solution was filtered and stabilized with a small amount of butanol and used as the test sludge solution.

The test was conducted by mixing 1 ml. of sludge solution into 10 ml. 100 neutral mineral oil containing various concentrations of test additives. The test samples were left standing for 16 plus hours and then rated visually. The test criterion was the lowest concentration of dispersant that prevents any precipitate formation. Thus, the lower the concentration, the more effective the dispersant. A present commercial dispersant is effective down to 0.063 weight percent. The lowest concentration for the graft copolymers of this Example 2 are set forth in Table 1. Weight percentages are based on the weight of the polymer.

TABLE 1

| Polymer* | Wt. % N,N-diallyl formamide | Wt. % di-t-butyl peroxide | Kinematic Viscosity (100° C.) | Lowest Effective Concentration |
|---|---|---|---|---|
| EPDM[1] | 8.2 | 2.7 | 2303 | 0.063 |
| Shellvis 250[2] | 6.0 | 2.0 | 3679 | 0.031 |

[1]Ethylene-propylene-diene monomer (Ortholeum 2052).
[2]Available from Shell Chemical, Houston, Texas.

What is claimed is:

1. A graft copolymer having viscosity index improving properties and dispersant properties;
   said copolymer comprising a star-shaped polymer to which is grafted a dispersing amount comprising from about 1 to about 50 weight percent, based on the weight of said star-shaped polymer, of an N-allyl amide, thereby forming a graft copolymer;
   said star-shaped polymer being further characterized by having a poly(polyalkenyl coupling agent) nucleus and at least 4 polymeric arms linked to said nucleus, and by being adapted to have an N-allyl amide grafted thereto under free-radical conditions;
   said graft copolymer being formed in and being in solution in a liquid poly(alpha-olefin) oligomer solvent.

2. The graft copolymer of claim 1 wherein said N-allyl amide is represented by the formula

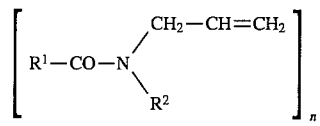

wherein $R^1$ is selected from hydrogen and optionally substituted alkyl and alkenyl groups containing from 1 to about 30 carbon atoms, or $R^1$ may be absent; $R^2$ is selected from hydrogen, optionally substituted alkyl and alkenyl groups containing from 1 to about 30 carbon atoms, optionally substituted cycloalkyl groups containing from about 6 to about 10 carbon atoms, and optionally substituted aryl groups containing from about 6 to about 10 carbon atoms; and n is 1 or when $R^1$ is absent n is 2.

3. The graft copolymer of claim 1 wherein said N-allyl amide is selected from the group consisting of: N,N-diallyl formamide, N,N-diallyl acetamide, N,N-diallyl propionamide, N,N-diallyl butyramide, N,N-diallyl heptanoamide, N,N-diallyl dodecamide, N,N-diallyl octadecamide, N,N-diallyl triacontamide, N,N-diallyl benzamide, N,N-diallyl naphthamide, N,N-diallyl-p-methyl benzamide, N-allyl formamide, N-allyl-N-methyl acetamide, N-allyl-N-ethyl propionamide, N-allyl-N-dodecyl formamide, N-allyl-p-methyl benzamide, N,N'-diallyl oxamide, N,N,N'-triallyl oxamide, N,N,N',N'-tetra-allyl oxamide, N,N-diallyl acrylamide, N-allyl-N-methyl acrylamide, N,N-diallyl lactamide, N,N-diallyl levulinamide, N,N-diallyl ethyl thioacetamide, 3-(N', N'-diethylamino)N,N-diallyl propionamide, N,N-diallyl 3-cyanopropionamide, N,N-diallyl 3-methyl sulfonyl propionamide, ethyl N,N-diallyl oxamate, and mixtures thereof.

4. A graft copolymer of claim 3 wherein said N-allyl amide is N-allyl formamide or N,N-diallyl formamide or a mixture thereof.

5. The graft copolymer of claim 1 wherein said poly(polyalkenyl coupling agent) nucleus is a poly(polyalkenyl aromatic compound) nucleus.

6. The graft copolymer of claim 1 wherein said poly(polyalkenyl coupling agent) nucleus is a poly(divinyl benzene) nucleus.

7. The graft copolymer of claim 1 wherein said polymeric arms are selected from the group consisting of homopolymers and copolymers of conjugated dienes, copolymers of conjugated dienes and monoalkenyl arenes, and mixtures thereof.

8. The graft copolymer of claim 1 wherein said polymeric arms are selected from the group consisting of polybutadiene and polyisoprene homopolymers, and isoprene/butadiene, isoprene/styrene and isoprene/styrene/isoprene copolymers.

9. The graft copolymer of claim 1 wherein said nucleus has from about 4 to about 15 polymeric arms linked thereto.

10. The graft copolymer of claim 1 wherein said polymeric arms are hydrogenated.

11. A lubricating oil additive concentrate comprising a copolymer of claim 1, such that the ratio of total oil to total active ingredients is from about 0.4:1 to about 0.56:1 or from about 0.60:1 to about 3.3:1.

12. A lubricating oil composition comprising a major proportion of an oil of lubricating viscosity and a minor proportion of a copolymer of claim 1.

13. A graft copolymer of claim 1 wherein said dispersing amount of N-allyl amide comprises from about 2 to about 25 weight percent based on the weight of the star polymer.

14. A graft copolymer of claim 1 wherein said dispersing amount of N-allyl amide comprises from about 5 to about 20 weight percent based on the weight of the star polymer.

15. A graft copolymer of claim 1 wherein said star-shaped polymer is further characterized by having a number average molecular weight of from about 2,000 to about 300,000.

16. A graft copolymer of claim 15 wherein said star-shaped polymer is further characterized by having a number average molecular weight of from about 10,000 to about 200,000.

17. A graft copolymer of claim 1 wherein said star-shaped polymer is further characterized by having a number average molecular weight of from about 30,000 to about 140,000.

18. A graft copolymer of claim 1 further characterized by having a number average molecular weight of from about 2,000 to about 500,000.

19. A graft copolymer of claim 18 further characterized by having a number average molecular weight of from about 10,000 to about 400,000.

20. A graft copolymer of claim 18 further characterized by having a number average molecular weight of from about 30,000 to about 150,000.

21. A composition of claim 1 wherein said poly(alpha-olefin) oligomer solvent comprises one or more hydrogen-treated liquid oligomers of $C_6$-$C_{12}$ alpha olefins.

22. A composition of claim 1 wherein said poly(alpha-olefin) oligomer solvent has a 100° C. viscosity of from about 2 to about 10 centistokes.

* * * * *